(12) United States Patent
Washisu

(10) Patent No.: US 6,757,488 B2
(45) Date of Patent: Jun. 29, 2004

(54) CONTROL APPARATUS FOR IMAGE BLUR CORRECTION

(75) Inventor: Koichi Washisu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/244,338

(22) Filed: Sep. 16, 2002

(65) Prior Publication Data

US 2003/0053803 A1 Mar. 20, 2003

(30) Foreign Application Priority Data

Sep. 20, 2001 (JP) .................................. 2001-286002

(51) Int. Cl.[7] .......................... G03B 17/00; G03B 5/00
(52) U.S. Cl. ...................... 396/55; 396/52; 348/208.4
(58) Field of Search ...................... 348/208.99, 208.4; 396/52–55

(56) References Cited

U.S. PATENT DOCUMENTS 5,335,032 A * 8/1994 Onuki et al. ................... 396/50

* cited by examiner

Primary Examiner—Russell Adams
Assistant Examiner—Arthur A Smith
(74) Attorney, Agent, or Firm—Robin, Blecker & Daley

(57) ABSTRACT

An optical apparatus is disclosed, which comprises a detecting unit which detects a vibration to output a vibration signal, an amplifying circuit which amplifies the vibration signal and has a changeable amplification factor, a driving member which drives a lens unit, and a changing circuit which changes the amplification factor depending on whether or not the lens unit is driven by the driving member, thereby making it possible to output a relatively stable vibration signal even when a disturbance vibration occurs.

12 Claims, 14 Drawing Sheets

CONTROL APPARATUS FOR IMAGE BLUR CORRECTION

BACKGROUND OF THE INVENTION

1. Field of the Invention

The present invention relates to an improvement in the signal controller for a vibration detecting unit mounted on an optical apparatus such as a compact camera.

2. Description of the Related Art

In current cameras, since all important operations for taking pictures such as exposure determination and focusing are automated, even a person unfamiliar with camera operations is very unlikely to fail in taking intended pictures.

In addition, systems for preventing camera shake have been under study recently, and factors inducing picture mistakes by a photographer have been practically eliminated.

A brief description will now be made of a system for preventing camera shake.

Camera shake at the time of picture taking typically involves vibrations of 1 Hz to 10 Hz in frequency. As a basic principle to allow pictures to be taken with no blur even with such camera shake occurring when a shutter is released, vibrations of a camera due to the camera shake must be detected to move a correcting lens in accordance with the detection value. Thus, taking pictures including no image blur even with camera shake requires exact detection of vibrations of the camera firstly, and correction of a change in optical axis due to the camera shake secondly.

The detection of vibrations (camera shake) can be performed in principle by providing the camera with a vibration detecting apparatus comprising of a vibration detecting sensor for detecting accelerations, angular accelerations, angular velocities, angular displacements or the like, and a control/arithmetic section for appropriately processing the output from the sensor to correct the camera shake. Based on the detection information, a correcting lens for decentering an optical axis for picture taking is driven to suppress picture blur.

FIG. 7 is a perspective view showing the outward appearance of a compact camera having a vibration preventing system. The camera has a function of correcting vertical camera shake and horizontal camera shake indicated by arrows 42p, 42y with respect to an optical axis 41. In the following description, "p" means the vertical direction and "y" means the horizontal direction.

A camera body 43 has a shutter release button 43a, a mode dial 43b (including a main switch), a retractable electronic flash 43c, and a viewfinder 43d.

FIG. 8 is a perspective view showing the internal structure of the camera shown in FIG. 7, in which reference numeral 44 shows a camera body, 51 a vibration correcting unit, 52 a correcting lens, 53 a support frame for freely driving the correcting lens 52 in directions 58p, 58y in FIG. 8 to correct image blur in the directions indicated by the arrows 42p, 42y in FIG. 7, details of which are later described. Reference numerals 45p, 45y show vibration detecting devices such as angular velocity meters, angular accelerometers or the like for detecting vibrations about axes as indicated by the arrows 46p, 46y.

Outputs from the vibration detecting devices 45p, 45y are converted by arithmetic devices 47p, 47y, later described, into target values for driving the correcting lens 52 in the vibration correcting unit 51 and input to coils 510p and 510y included in the vibration correcting unit 51 to correct image blur. Reference numeral 54 shows a base plate. Reference numerals 56p, 56y show permanent magnets. The permanent magnets 56p and 56y, and coils 510p and 510y constitute part of components of a driver for driving the correcting lens 52.

FIG. 9 is a block diagram showing details of the arithmetic devices 47p, 47y. Since both devices have the same configurations, description is made in FIG. 9 only for arithmetic device 47p.

The arithmetic device 47p comprises a DC cut filter 48p, a low pass filter 49p, an analog-digital converting circuit (hereinafter referred to as "A/D converting circuit") 410p, a driver 419p, and a camera microcomputer 411 surrounded by a broken line, all of which are surrounded by a dash dotted line.

The camera microcomputer 411 comprises a storage circuit 412p, a differential circuit 413p, a DC cut filter 414p, an integrating circuit 415p, a storage circuit 416p, a differential circuit 417p, and a PWM duty changing circuit 418p.

A vibration gyro for detecting the angular velocity of camera shake is used as the vibration detecting device 45p. The vibration gyro is driven in synchronization with turn-on of the main switch of the camera to start detection of the angular velocity of camera shake.

An output signal from the vibration detecting device 45p is input to the DC cut filter 48p formed of an analog circuit which cuts a DC bias component superimposed on the output signal. The DC cut filter 48p has a characteristic of cutting signal components at frequencies equal to or lower than 0.1 Hz, so that no influence is exerted on a frequency band of camera shake from 1 to 10 Hz. Such a characteristic of cutting frequencies of 0.1 Hz or lower, however, presents a problem that it takes nearly 10 seconds from the input of the vibration signal from the vibration detecting device 45p to the completion of the DC cut. To address the problem, the DC cut filter 48p is set to have a small time constant (for example, to have a characteristic of cutting signal components at frequencies equal to or lower than 10 Hz), for example for 0.1 seconds after turn-on of the main switch, to cut DC components in a short time period of approximately 0.1 seconds. Then, the time constant is set to be larger (to have a characteristic of cutting frequencies of 0.1 Hz or lower). In this manner, deterioration of a vibration angular velocity signal due to the DC cut filter 48p is prevented.

An output signal from the DC cut filter 48p is input to the low pass filter 49p formed of an analog circuit which appropriately amplifies the signal in accordance with the resolution of the A/D converting circuit 410p and cuts noise at high frequencies superimposed on the vibration angular velocity signal. This is performed for the purpose of preventing the noise in the vibration angular velocity signal from causing erroneous reading of the signal sampled by the A/D converting circuit 410p when the signal is input to the camera microcomputer 411. An output signal from the low pass filter 49p is sampled by the A/D converting circuit 410p and acquired by the camera microcomputer 411.

While the DC bias components have been cut by the DC cuter filter 48p, the amplification by the low pass filter 49p causes DC bias components to be again superimposed on the vibration angular velocity signal. Thus, DC cut must be performed again in the camera microcomputer 411.

For example, a vibration angular velocity signal sampled 0.2 seconds after the turn-on of the switch of the camera is stored in the storage circuit 412p, and then the differential circuit 413p determines a difference between the stored value and the vibration angular velocity signal from the A/D converting circuit 410p to perform DC cut. This operation can only achieve rough DC cut (since the vibration angular velocity signal stored 0.2 seconds after the turn-on of the main switch of the camera includes not only DC components but also actual camera shake), so that the DC cut filter 414p formed of a digital filter in a subsequent stage performs adequate DC cut.

The DC cut filter 414p has a changeable time constant similarly to the analog DC cut filter 48p, in which the time constant is gradually increased in a time period of 0.2 seconds after the lapse of 0.2 seconds from the turn-on of the main switch of the camera. Specifically, the DC cut filter 414p has a characteristic of cutting frequencies of 10 Hz or lower when 0.2 seconds has elapsed since the turn-on of the main switch, and thereafter, the frequency cut by the filter 414p is reduced to 5 Hz, 1 Hz, 0.5 Hz, and 0.2 Hz each time 50 milliseconds have elapsed.

During the aforementioned operation, however, if a photographer half presses the shutter release button 43a (turn on a sw1) to perform photometric and distance measurements, a picture may be taken immediately and it is not preferable to spend the aforementioned time period to change the time constant. In such a case, the change in the time constant is stopped in progress in accordance with conditions for taking a picture.

For example, when the results of the photometric and distance measurements show a shutter speed of 1/60 second and a focal length of 150 mm, high accuracy is not required for preventing vibrations, and thus the change in the time constant of the DC cut filter 414p is stopped at the time when the time constant is changed to cut frequencies of 0.5 Hz or lower (the change amount in the time constant is controlled on the basis of the product of the shutter speed and the focal length).

This can reduce the time taken for changing the time constant to give priority to a shutter chance. As a matter of course, when a higher shutter speed or a smaller focal length is shown, the change in the time constant of the DC cut filter 414p is stopped at the time when the time constant is changed to cut frequencies of 1 Hz or lower. Alternatively, when a lower shutter speed or a larger focal length is shown, picture taking is prohibited until the time constant is changed to the end.

The integrating circuit 415p starts integration of an output signal from the DC cut filter 414p in response to a half-press of the shutter release button 43a of the camera (turn-on of the sw1) to convert the angular velocity signal to an angle signal. However, when the change in the time constant of the DC cut filter 414p is not completed as described above, the integrating circuit 415p does not perform the integration until the time constant change is completed.

Although omitted in FIG. 9, the integrated angle signal is appropriately amplified in accordance with information on the focal length and subject distance at that time, and converted to drive the correcting lens 52 by an appropriate amount in accordance with the vibration angle (this correction must be performed since zoom or focusing causes a change in the status of a picture-taking optical system to change an amount of decentering the optical axis for an amount of driving the correcting lens 52.

The drive of the correcting lens 52 is started in accordance with the vibration angle signal in response to a complete press of the shutter release button 43a (turn-on of a sw2). At this time, care must be taken not to suddenly start the vibration correcting operation of the correcting lens 52. The storage circuit 416p and the differential circuit 417p are provided for this purpose.

The storage circuit 416p stores the vibration angle signal from the integrating circuit 415p in synchronization with the complete press (turn-on of the sw2) of the shutter release button 43a. The differential circuit 417p determines a difference between the signal from the integrating circuit 415p and the signal in the storage circuit 416p. Thus, the two signals input to the differential circuits 417p are equal to each other when the switch sw2 is turned on and the differential circuit 417p produces a signal representing zero which indicates a target value for driving the correcting lens 52, and thereafter, produces continuous outputs from zero (the storage circuit 416p functions to set the integrated signal when the switch sw2 is turned on to an original). With this configuration, the correcting lens 52 is not driven suddenly.

A target value signal from the differential circuit 417p is input to the PWM duty changing circuit 418p. When a voltage or a current in accordance with a vibration angle is applied to the coil 510p (see FIG. 8) included in the vibration correcting unit 51, the correcting lens 52 is driven in accordance with the vibration angle. PWM drive is desirable in order to save power consumption for driving the correcting lens 52 and power consumed by a transistor for driving the coils 510p and 510y.

The PWM duty changing circuit 418p changes a coil drive duty in accordance with a target value. For example, in PWM with a frequency of 20 KHz, duty "0" is set for the target value of "2048" of the differential circuit 417p, duty "100" for the target value of "4096", and a duty is determined in accordance with a target value in the range between the two values divided into equal parts. The determination of a duty is finely controlled not only with the target value but also conditions (temperature, the attitude of the camera, the status of power supply) for picture taking by the camera at a particular time to perform accurate vibration correction.

An output from the PWM duty changing circuit 418p is input to the driver 419p formed of a PWM driver circuit, the coil 510p and others. In this manner, the output is applied to the coil 510p (see FIG. 8) in the driver 419p to drive the correcting lens 52 for the vibration correction operation. The driver 419p is turned on in synchronization with the turn-on of the switch sw2, and turned off when exposure of a film to light is completed. Even when the exposure is completed, the integrating circuit 415p continues the integration as long as the shutter release button 43a is half pressed (the sw1 is on), and the storage circuit 416p stores a new integrated output when the switch sw2 is next turned on.

When the half-press of the shutter release button 43a is released, the integrating circuit 415p stops the integration of the output from the DC cut filter 414p to reset the integrating circuit 415p. The reset means emptying the information integrated until that time.

The vibration detecting device 45p is turned off in response to turn-off of the main switch to end the sequence of vibration prevention.

When an output signal from the integrating circuit 45p has a value larger than a predetermined value, it is determined that the camera is panned, and the time constant of the DC cut filter 414p is changed. For example, the characteristic of cutting frequencies of 0.2 Hz or lower is changed to the characteristic of cutting frequencies of 1 Hz or lower, and the time constant is returned to the original one in a predetermine time period. The change amount of the time constant is controlled on the basis of the magnitude of the output from the integrating circuit 415p. Specifically, when the output signal exceeds a first threshold value, the DC cut filter 414p is set to have the characteristic of cutting frequencies of 0.5 Hz or lower, and when the output signal exceeds a second threshold value, frequencies of 1 Hz or lower are cut, and when the output signal exceeds a third threshold value, frequencies of 5 Hz or lower are cut.

When an output from the integrating circuit 415p is significantly large, the integrating circuit 415p is once reset to prevent saturation (overflow) in arithmetic processing.

In FIG. 9, the DC cut filter 414p is designed to start operation 0.2 seconds after the main switch is turned on, but the operation is not limited to that start timing and may be started by a half-press of the shutter release button 43a. In this case, the operation of the integrating circuit 415p is started from the time when the change in the time constant of the DC cut filter is completed.

While the integrating circuit 415p starts to operate by a half-press of the shutter release button 43a (the turn-on of the sw1), the integrating circuit 415p may be designed to start operation in response to a complete press of the shutter release button 43a (the turn-on of the sw2). In this case, the storage circuit 416p and the differential circuit 417p are not necessary.

The DC cut filter 48p and the low pass filter 49p are provided in the arithmetic device 47p in FIG. 9, but they may be provided in the vibration detecting device 45p.

FIGS. 10 to 12 show details of the vibration correcting unit 51 and a part of the driver 419p for driving the vibration correcting unit 51 (including the coil 510p, the permanent magnet 56p and others). Specifically, FIG. 10 is a front view of these components, FIG. 11(a) is a side view of them viewed from a direction indicated by an arrow B in FIG. 10, FIG. 11(b) is section view taken along a line A—A in FIG. 10, and FIG. 12 is a perspective view of the respective components.

The correcting lens 52 (as shown in FIG. 11(b)) is formed of two lenses 52a, 52b fixed to the support frame 53 and a lens 52c fixed to the base plate 54. These lenses constitute an optical unit of a picture-taking optical system.

A yoke 55 made of a ferromagnetic material is attached to the support frame 53. The permanent magnets 56p, 56y (indicated by broken lines representing hidden lines in FIG. 10) made of neodymium or the like are fixed by absorption to the back of the yoke 55. Three support shafts 53a extending radially from the support frame 53 fit into elongated holes 54a provided in side walls 54b of the base plate 54, respectively.

As shown in FIG. 11(a) and FIG. 12, since the support shafts 53a fit into the elongated holes 54a, no movement in the direction of an optical axis 57 of the correcting lens 52 occurs. However, the elongated holes 54a extend in the direction orthogonal to the optical axis 57. Thus, the support frame 53 is prevented from moving with respect to the base plate 54 in the direction of the optical axis 57 but can freely move in a plane orthogonal to the optical axis (directions indicated by arrows 58p, 58y, 58r). However, such movement is suppressed elastically in the respective directions (58p, 58y, 58r) by extension springs 59 put between pins 53b on the support frame 53 and pins 54c on the base plate 54 as shown in FIG. 11.

The coils 510p, 510y (partially indicated by broken lines representing hidden lines) are attached to the base plate 54 opposite to the permanent magnets 56p, 56y. The yoke 55, the permanent magnet 56p, and the coil 510p are arranged as shown in FIG. 11(b) (the permanent magnet 56y and the coil 510y are arranged identically). When a current is passed through the coil 510p, the support frame 53 is driven in the direction of the arrow 58p, and when a current is passed through the coil 510y, the support frame 53 is driven in the direction of the arrow 58y.

The drive amount of the correcting lens 52 is determined by the balance between the spring constant of the extension springs 59 and thrust caused from interaction between the coils 510p, 510y and the permanent magnets 56p, 56y in the respective directions. In other words, the decentering amount of the correcting lens 52 can be controlled on the basis of an amount of current passed through the coils 510p, 510y.

The vibration preventing system described above has a problem in the accuracy of detection of angular velocities by the vibration gyro serving as the vibration detecting device.

The small-sized vibration gyro is an inertial sensor which is a device for detecting camera shake, while not so expensive, and suitable for development in consumer products. However, when an attempt is made to detect a very low angular velocity of camera shake with a small-sized, the sensor is overly sensitive to relay an error due to disturbance vibrations.

FIG. 13 is a conceptual diagram showing the frequency characteristic in detection sensitivity of a small vibration gyro. A Bode diagram 61 shows a sensitivity at a point 62 near a frequency of 250 Hz nearly 300 times higher than that at frequencies of approximately 1 Hz to 10 Hz which correspond to the frequency band of camera shake. When a disturbance vibration occurs at a frequency near 250 Hz, the vibration is amplified 300 times larger than camera shake to exert an adverse effect in arithmetic processing.

As described in FIG. 9, the signal of the vibration detecting device 45p which is a vibration gyro is integrated by the integrating circuit 415p. Thus, it appears that, even when the camera shake signal includes superimposed components caused by the aforementioned disturbance at approximately 250 Hz, the components from the detected disturbance vibration are smoothed by the integrating circuit 415p to allow extraction of only the camera shake components.

However, the signal from the vibration detecting device 45p in FIG. 9 is amplified by the low pass filter 49p which is an analog circuit to a level at which the camera shake signal can be accurately detected. When the signal components from the aforementioned disturbance vibration occur with the amplification factor set optimally, the signal is saturated before it is input to the camera microcomputer 411 for arithmetic processing, and the integration of the camera shake components cannot be performed.

As described in FIG. 9, the output from the low pass filter 49p is acquired by the camera microcomputer 411 after the quantization at the A/D converting circuit 410p. If the low pass filter 49p has a low signal amplification factor, very small vibrations are not represented faithfully and accurate vibration correction is impossible.

To address this, the low pass filter 49p amplifies the vibration detection signal from the DC cut filter 48p with a large amplification factor such that the maximum angular velocity (for example, 10 deg/s) produced when a photographer gets a camera ready to take pictures, results in a magnitude on the verge of signal saturation after the amplification. However, even when the angular velocity of the aforementioned disturbance vibration is low, for example 0.05 deg/s, the signal is amplified by 300 times to 15 deg/s with the frequency characteristic shown in FIG. 13 to saturate the low pass filter 49p.

A countermeasure against it is to reduce the amplification factor of the low pass filter 49p. In this case, circuit saturation can be prevented but only low accuracy can be achieved for arithmetic processing of camera shake all the time and sufficient camera shake correction cannot be performed.

Examples of actual disturbance vibrations in cameras include lens drive for changing the focal length or focusing of a picture-taking optical system. The lens drive typically involves transfer of a drive force of a motor through a gear train. The motor often operates at approximately 1500 rpm which is converted to a frequency of 250 Hz, substantially corresponding to the peak of the sensitivity of the vibration gyro (see 62 in FIG. 13). Thus, the signal of the vibration gyro is saturated when the focal length is changed or focusing is achieved, and vibration correction cannot be performed.

In a single-lens reflex camera, for example, a photographer can see the effect of vibration correction through a picture-taking optical system while the photographer aims the camera at a subject before exposure. When the lens is driven for focusing at this time, vibration correction is impossible during the lens drive.

Also in a compact camera, signal components from a disturbance vibration are superimposed on a signal of a vibration gyro during the lens drive for changing the focal length or focusing, thereby causing saturation of circuits (such as the low pass filter 49p (49y)) for processing the detected vibration output. In a compact camera, however, vibration correction is actually performed only during exposure, so that it appears that there is no harm if the circuit is saturated before the exposure.

However, once the circuit is saturated, a time period of, for example approximately one second, is required before the circuit is stabilized. For this reason, the vibration preventing system is not stabilized immediately even after the elimination of the aforementioned saturation, presenting a problem that pictures cannot be taken during that time period.

This is because the large time constants of the DC cut filter 414p or the integrating circuit 415p require a long time period from the start of the circuit operation to the signal stabilization. To address this, as described with reference to FIG. 9, the time constant of the DC cut filter 414p is switched from the small one to the large one in the early stage of the circuit operation, or the time constant is also switched in the integrating circuit 415p, but even with these changes, processing cannot be recovered immediately after the disturbance vibration is eliminated.

In some types of vibration gyro using a low-viscosity material such as a crystal for its vibrator, once a disturbance vibration is applied thereto, the vibration gyro outputs an error signal for some time even after the input of the disturbance vibration ceases, and the circuit is continuously saturated during that output.

FIG. 14 shows the measurement result of the relationship between a focusing drive sequence in a compact camera and a gyro error signal (meaning an error signal of a vibration gyro).

A shutter release button of the camera is completely pressed (at the time indicated by reference numeral 72), and after a while, focusing drive of a picture-taking optical system is performed (in a focusing drive period 73). When the focusing drive is completed, shutter opening drive 74 is performed (exposure period 75).

A gyro error signal 71 is produced from the start of the focusing drive, and is continuously output after the end of the focusing drive. As shown in FIG. 14, the gyro error signal 71 has an amplitude which becomes greater after the start of the focusing drive, then becomes smaller, again becomes greater after the end of the focusing drive, and is converged. This is because the most sensitive frequency (for example, 250 Hz) of the vibration gyro is passed during acceleration of a motor at the start of the focusing drive, and then the most sensitive frequency is again passed during deceleration of the motor after the end of the focusing drive.

In this manner, the vibration gyro produces a large error signal for a while after the end of the focusing drive, so that the circuit is continuously saturated until immediately before exposure. Even when the saturation of the circuit is eliminated thereafter, stable vibration correction cannot be achieved for a short time.

SUMMARY OF THE INVENTION

It is the first object of the present invention to provide a signal controller for a vibration detecting unit which experiences no saturation of a circuit for processing a detected vibration output even when a disturbance vibration occurs and which can achieve accurate vibration correction immediately after drive of a picture-taking optical system is completed.

It is a second object of the present invention to provide a signal controller for a vibration detecting unit which gives priority to accurate arithmetic processing for vibration detection when a disturbance vibration, even if occurring, has a small influence on a detected vibration output.

The present invention is characterized by an optical apparatus or system comprising:

a detecting unit which detects a vibration to output a vibration signal;

an amplifying circuit which amplifies the vibration signal and has a changeable amplification factor;

a driving member which drives a lens unit; and a changing circuit which changes the amplification factor depending on whether or not the lens unit is driven by the driving member.

Specifically, the vibration signal from the detecting unit is an analog signal, and the optical apparatus and system further comprises a converting circuit which converts the signal amplified by the amplifying circuit to a digital signal, and the changing circuit changes a processing program for the digital signal depending on whether or not the lens unit is driven.

The changing circuit changes the amplification factor after a predetermined time period taking place upon completion of the drive of the lens unit.

The changing circuit changes the processing program after a predetermined time period taking place upon completion of the drive of the lens unit.

The changing circuit sets the amplification factor to be low during the drive of the lens unit and sets the amplification factor to be high when the lens unit isn't being driven of the lens unit.

The changing circuit sets the amplification factor to be low during the drive of the lens unit and sets the amplification factor to be high when the lens unit isn't being driven of the lens unit, and the changing circuit sets the digital signal to be high during the drive of the lens unit and sets the digital signal to be lower when the lens unit isn't being driven unit than the large digital signal during the drive of the lens unit.

The lens unit includes a focusing lens.

The lens unit includes a zoom lens.

The device further comprises of a correcting optical unit which corrects image blur in accordance with the vibration signal from the detecting unit.

Additional characteristics will be apparent from the following description with reference to the accompanying drawings.

DESCRIPTION OF THE PREFERRED EMBODIMENTS

The present invention is hereinafter described on the basis of preferred embodiments shown in the accompanying drawings.

(Embodiment 1)

Figure 1:
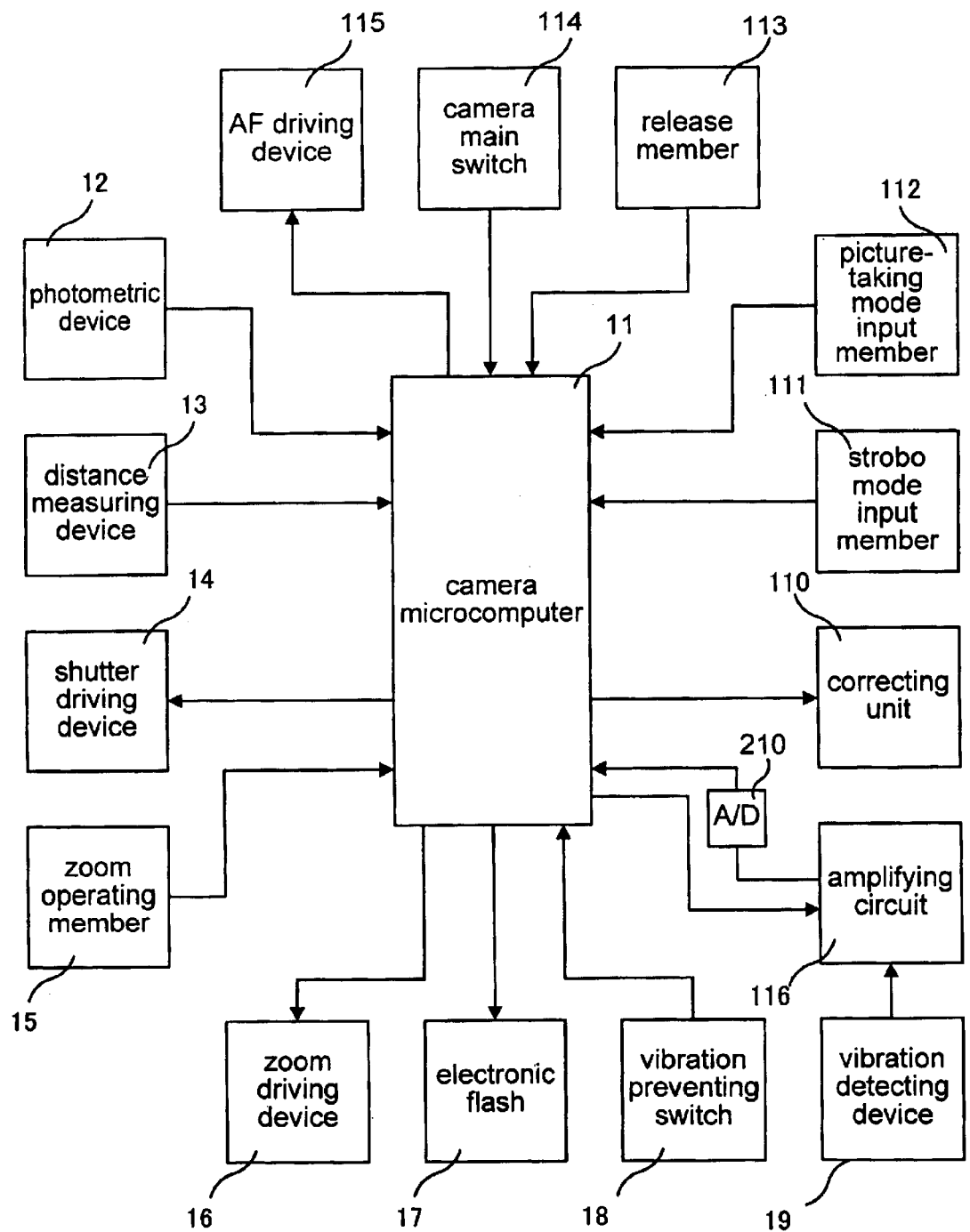
FIG. 1 is a block diagram showing the configuration of main portions of a camera according to an embodiment (embodiment 1) of the present invention.

FIG. 1 is a block diagram showing main portions of a camera according to an embodiment of the present invention. Other components of the camera are omitted to simplify description. The basic constitution of the camera in this embodiment is similar to that of the camera shown in FIG. 7 to FIG. 12. There are differences in the controller for a vibration detecting unit (circuit) in the embodiment from that of the camera shown in FIG. 7 to FIG. 12.

With reference to FIG. 1, when a camera microcomputer 11 receives a signal from a camera main switch 114, it extends a lens barrel from a state in which the barrel is collapsed in a camera body to a position at which pictures can be taken, and simultaneously opens a lens barrier (not shown in FIG. 1). At this time, the camera microcomputer 11 starts operation of a vibration detecting device 19 which detects vibration (shake) of the camera in the vertical and horizontal direction. Furthermore, a controller of the vertical direction and a controller of the horizontal direction are provided separately in the vibration detecting device 19, actually. However, within the description of this embodiment, they will be considered one controller.

The camera microcomputer 11 receives a picture-taking mode selected by a photographer from a picture-taking mode input member 112. Picture-taking modes include a sport mode suitable for taking pictures of a subject moving around, a portrait mode suitable for taking pictures of a person close to the camera, a macro mode suitable for taking close-ups of a subject, and a nightscape mode suitable for taking pictures of nights scenes.

The camera microcomputer 11 receives a strobe mode from a strobe mode input member 111. Strobe modes include a strobe-off mode in which an electronic flash is not used, a strobe-on mode in which the electronic flash is forcedly used, and a strobe-auto mode in which whether or not the electronic flash is used is controlled depending on luminance of a subject, directions of rays and the like. In addition, it is possible to set whether or not a red-eye preventing function is activated or not when the electronic flash is used.

When a photographer determines whether or not the vibration correction operation is performed in taking pictures by operating a vibration preventing switch 18, that information is input to the camera microcomputer 11. When the photographer aims the camera at a subject and then operates a zoom operating member 15, a zoom signal is input to the camera microcomputer 11 which controls a zoom driving device 16 based on the zoom signal to change a focal length.

When the photographer half presses a release member 113 (turns on a sw1) which is a shutter release button after the determination of the focal length, a distance measuring device 13 measures a distance to a subject at that time and sends the resulting information to the camera microcomputer 11.

At this time, vibration information from the vibration detecting device 19 is also input to the camera microcomputer 11 which determines based on the vibration state whether the camera is held by photographer's hands or fixed on a tripod or the ground.

While the vibration detecting device 19 may be started when the release member 113 is half pressed, the vibration detecting device 19 is started in synchronization with turn-on of a camera main switch 114 in this embodiment due to low reliability of vibration detection immediately after the start.

A photometric device 12 measures luminance of a subject and outputs the resulting information to the camera microcomputer 11. The camera microcomputer 11 then calculates an exposure time based on the information for taking pictures so far determined such as the information on the luminance, the type and sensitivity of a film, the use condition of a vibration preventing optical system, the focal length and F number, the picture-taking mode, the selection of vibration correction, the information on the distance to the subject, and the information on the vibration. Simultaneously, the camera microcomputer 11 determines whether or not an electronic flash 17 is used.

When the release member 113 is completely pressed (a sw2 is turned on), the camera microcomputer 11 controls an AF driving device 115 to partially or entirely drive the lens barrel based on the distance information to perform focus adjustment of a picture-taking optical system. After the focusing operation, the camera microcomputer 11 controls a correcting unit 110 based on a signal from the vibration detecting device 19 formed of a vibration gyro to start the vibration correction operation. Then, the camera microcomputer 11 controls a shutter driving device 14 to expose the film to light, and causes the electronic flash 17 to emit light as circumstances demand.

In the aforementioned configuration, an output from the vibration detecting device 19 is input to the camera microcomputer 11 through an amplifying circuit 116. The amplifying circuit 116 comprises the DC cut filter 68 and the low pass filter 69 in FIG. 2. The amplifying circuit 116 amplifies and outputs the signal from the vibration detecting device 19 to the camera microcomputer 11. The camera microcomputer 11 starts digital arithmetic processing of a signal quantized by the A/D converting circuit 210p.

On the other hand, a control/arithmetic section (changing circuit) 118 in camera microcomputer 11 provides the amplifying circuit 116 with a signal which controls switching of the time constant of the DC cut filter 68 included therein in the same manner described in the "related art of the invention" and which can change the amplification factor of the low pass filter 69.

The amplification factor of the low pass filter 69 is changed in accordance with the drive state of the AF driving device 115 or the zoom driving device 16. Specifically, the amplification factor of the low pass filter 69 is reduced to prevent saturation of circuits (such as the low pass filters 69) during the operation and for a predetermined time period (for example, 0.3 seconds) after the operation of the zoom driving device 16 or the AF driving device 115. During the time period in which the amplification factor of the low pass filter 69 is reduced in this manner, the amplification factor in the arithmetic processing in the control/arithmetic section 118 in the camera microcomputer 11 is changed to present no variation in gain as a whole. The control/arithmetic section 118 has similar constitution to that of microcomputer 411 in FIG. 9. But, in this embodiment, the control/arithmetic section 118 includes an amplification adjusting section 117.

Figure 9:
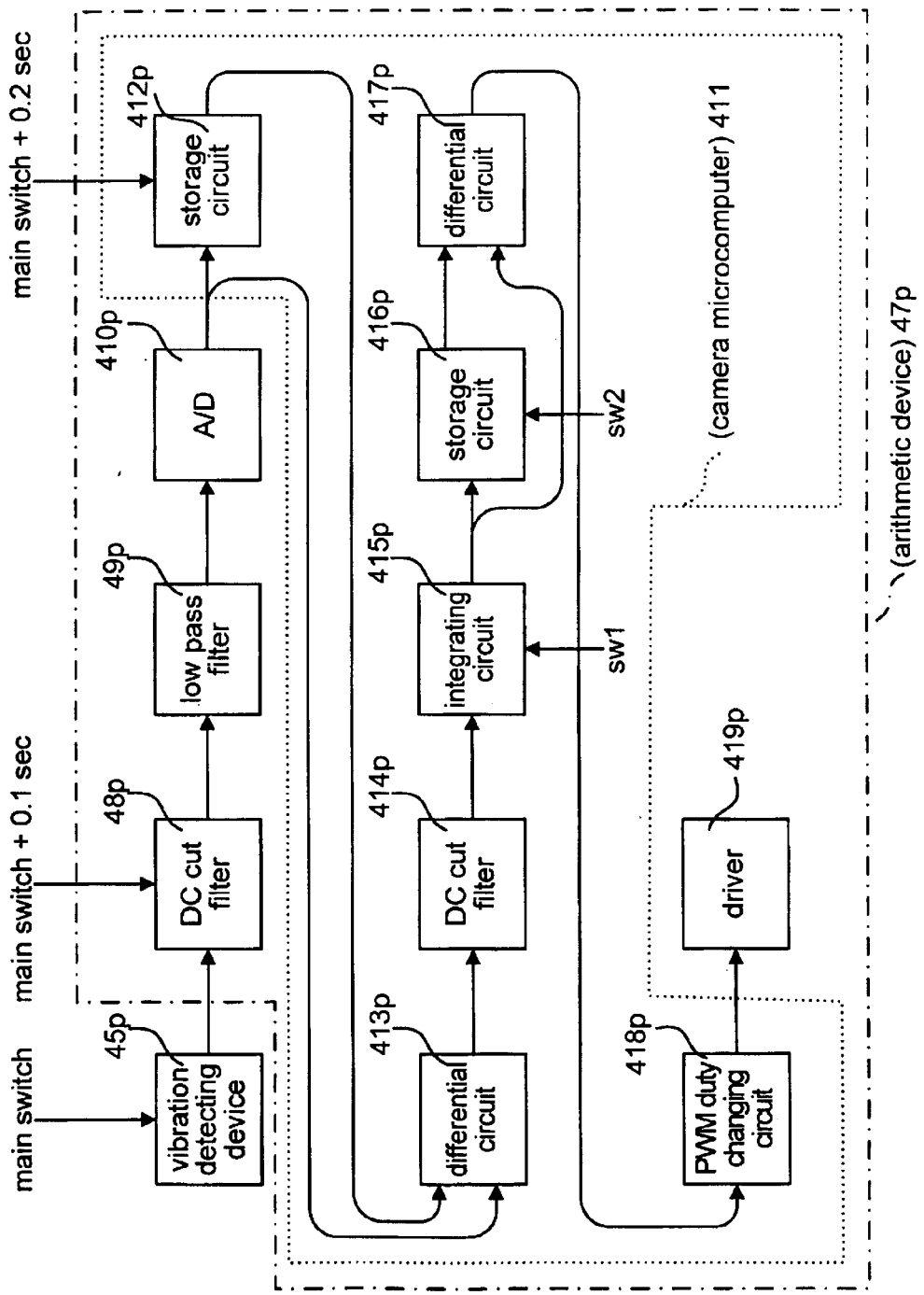
FIG. 9 is a block diagram showing the electrical configuration of the vibration preventing system in the related art.
Figure 10:
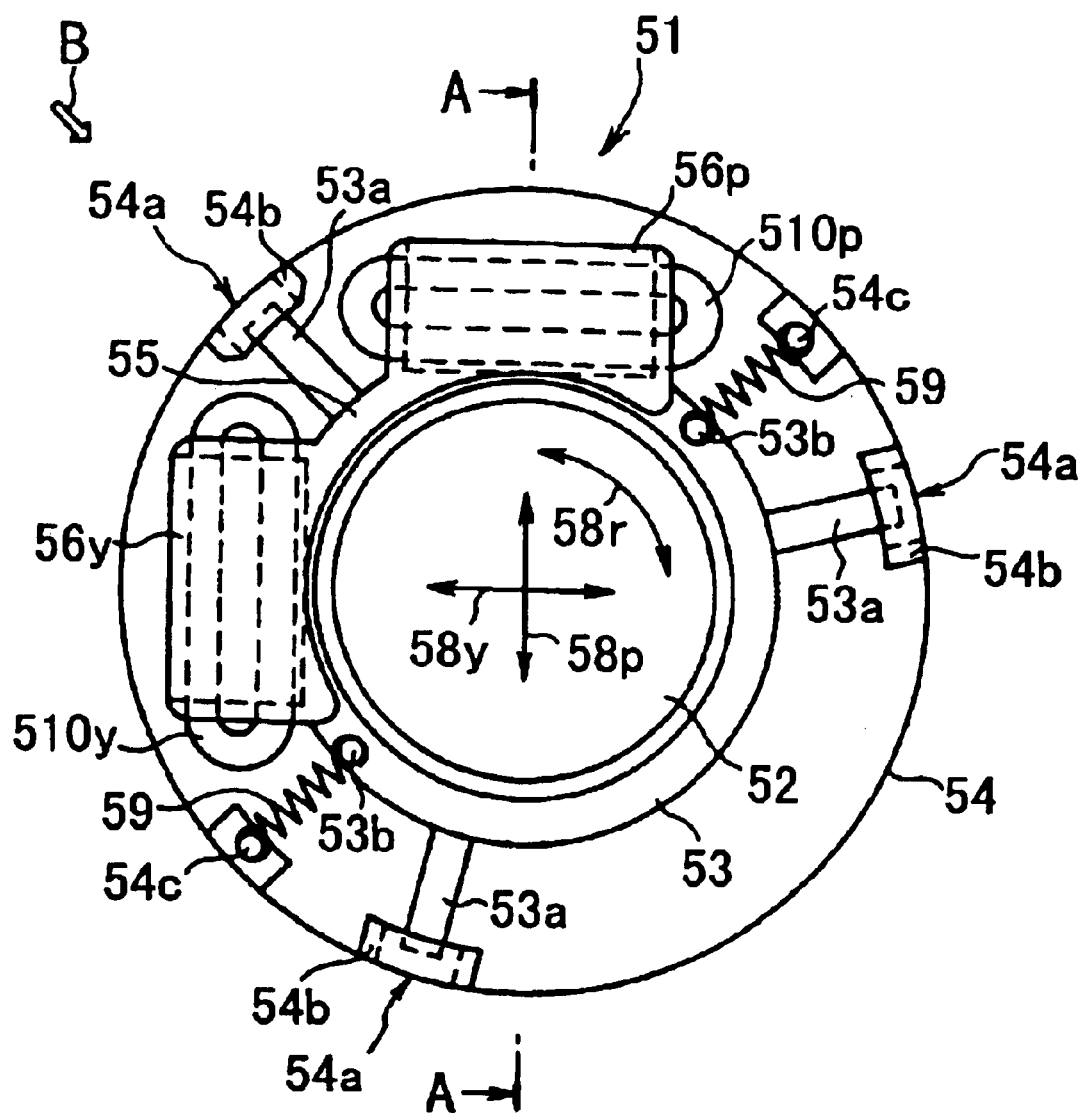
FIG. 10 is a front view showing a vibration correcting optical element in the related art.
Figure 11A:
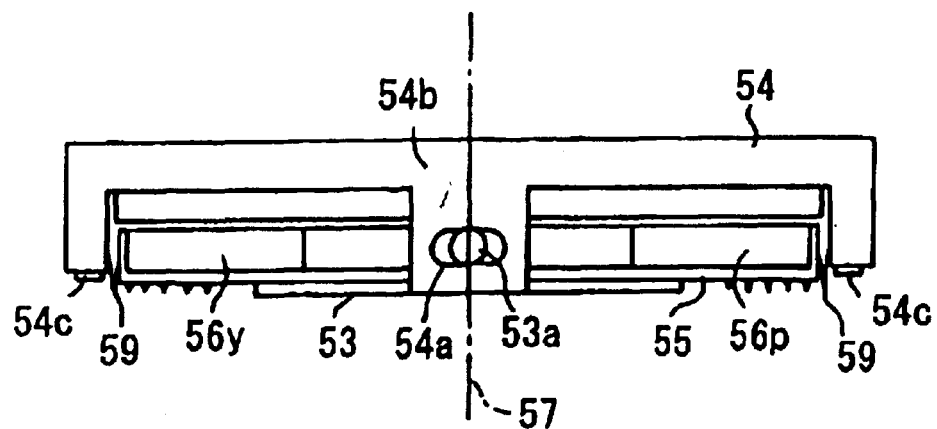
FIG. 11(a) is a side view from a direction indicated by an arrow B in FIG. 10.
Figure 11B:
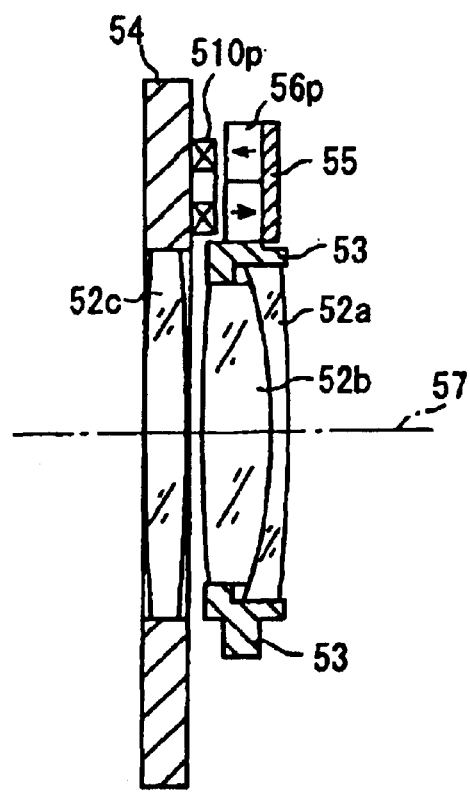
FIG. 11(b) is section view taken along a line A—A in FIG. 10.
Figure 12:
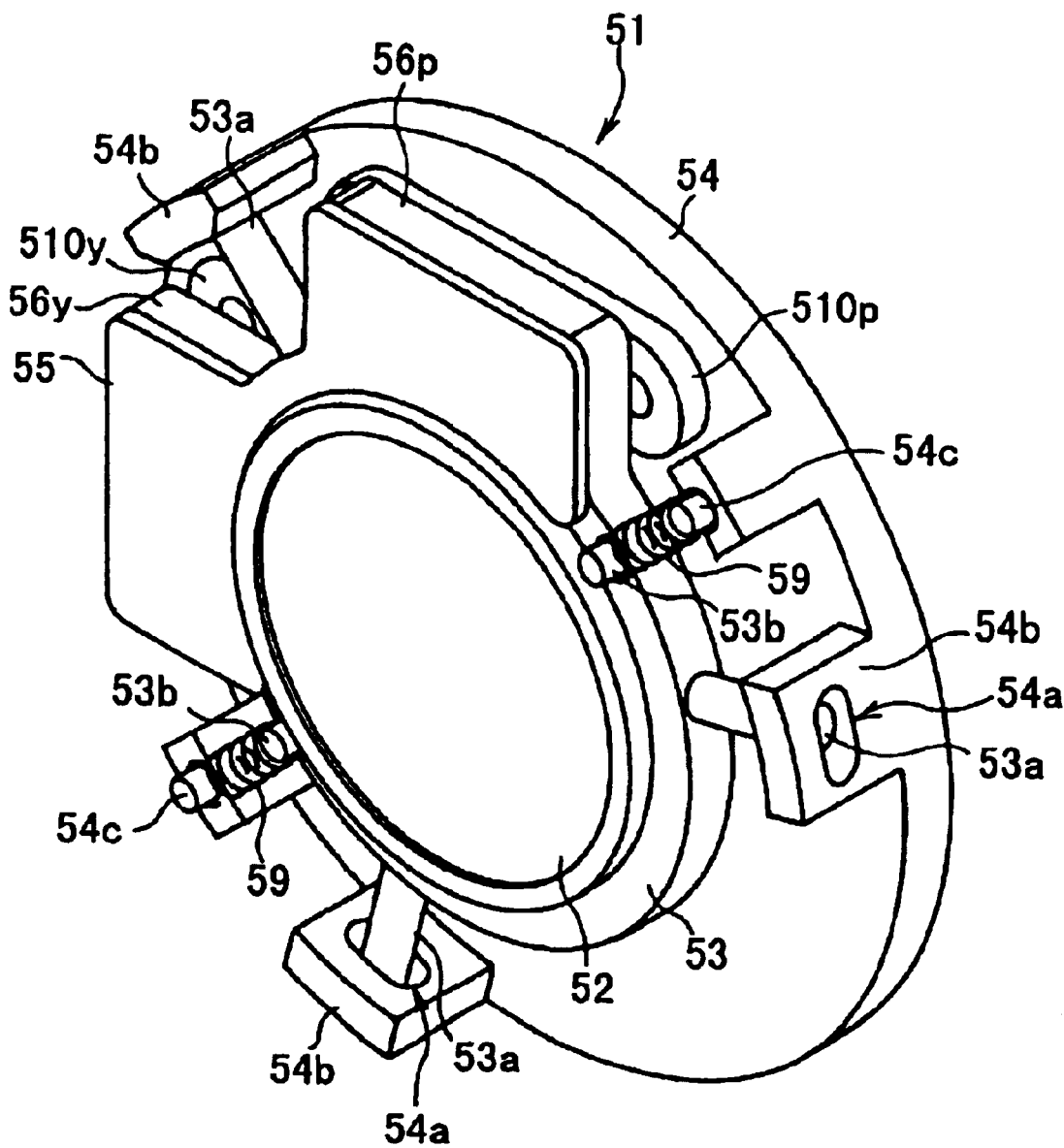
FIG. 12 is a perspective view showing the vibration correcting optical element in the related art.
Figure 13:
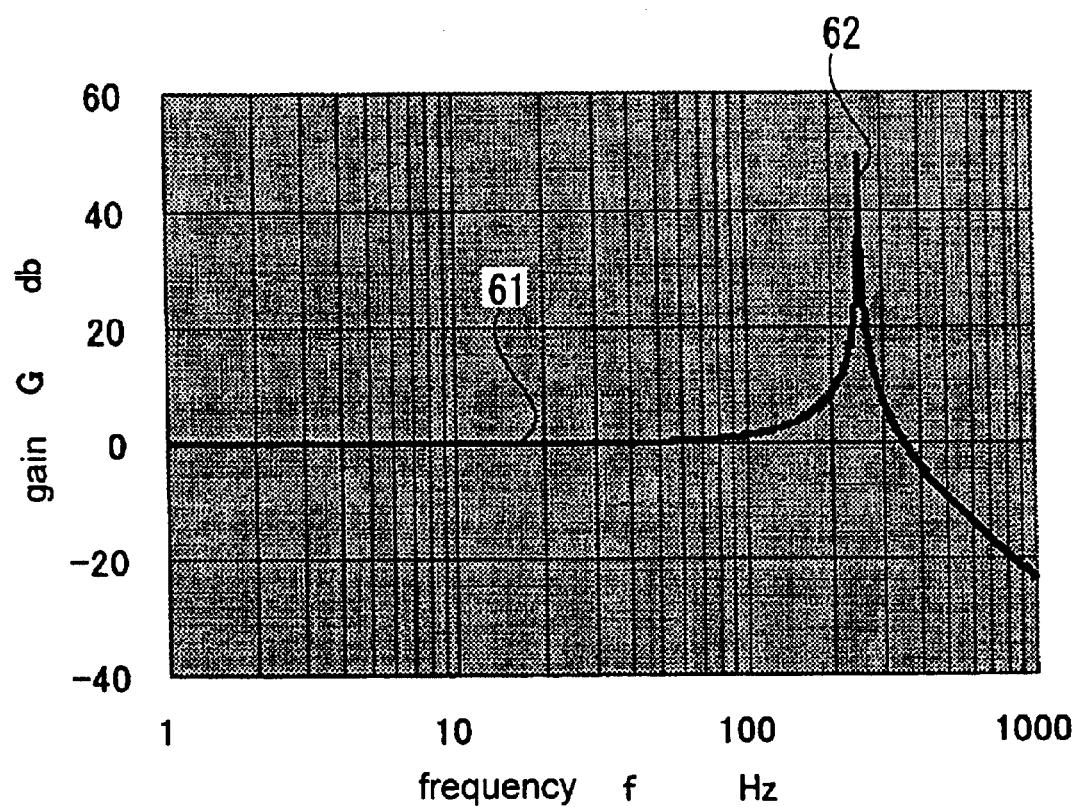
FIG. 13 is a conceptual diagram showing the frequency characteristic in detection sensitivity of a typical vibration detecting device.
Figure 14:
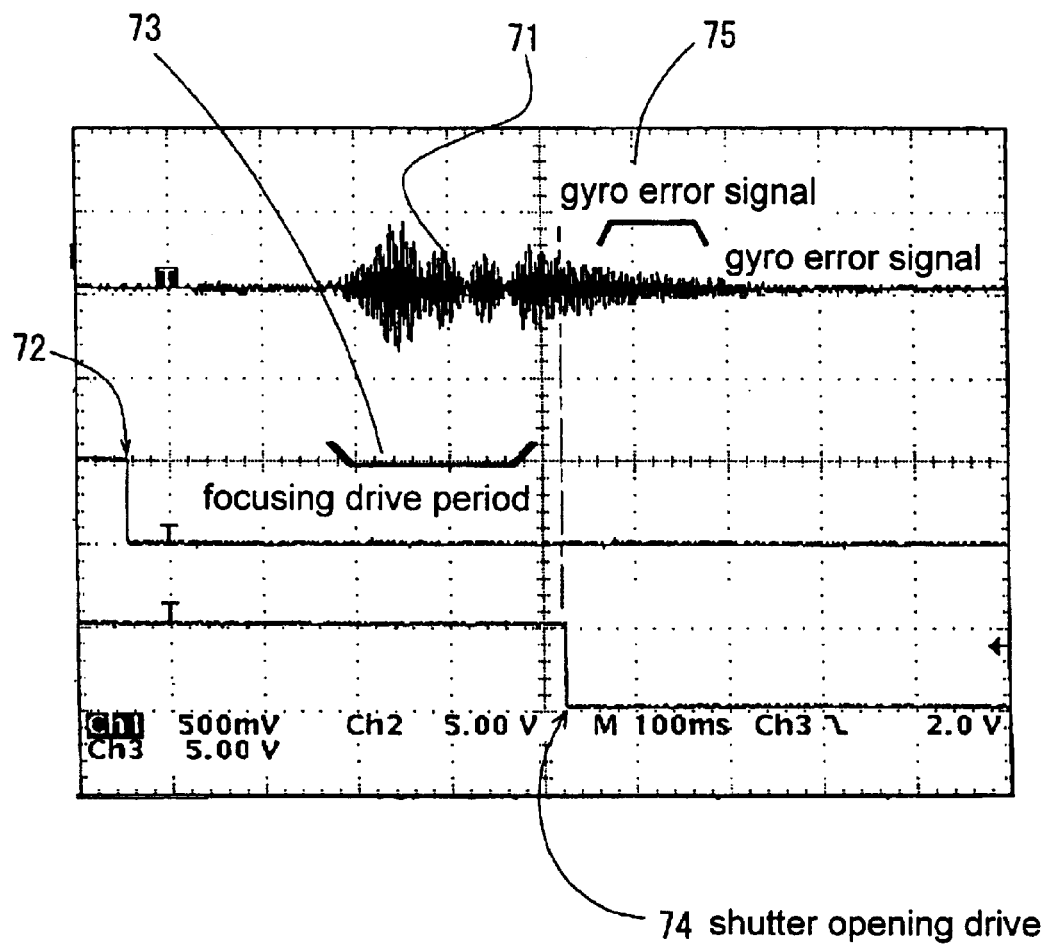
FIG. 14 is an explanatory drawing for the relationship between typical lens drive and the output from the vibration detecting device.

The adjustment of the amplification factor by the control/arithmetic section 118 is performed after the signal is amplified by the amplifying circuit 116, quantized by the A/D converting circuit 210, and acquired by the camera microcomputer 11, and before the signal is input to the storage circuit (shown by 412p (412y) in FIG. 9) and the differential circuit (shown by 413p (413y) in FIG. 9). This is because the change amplification factor must be adjusted before input of the signal to the DC cut filter (shown by 414p (414y) in FIG. 9) or the integrating circuit (shown by 415p (415y) in FIG. 9) since input of a discontinuous signal with different amplification factors deteriorates arithmetic accuracy.

Figure 2:
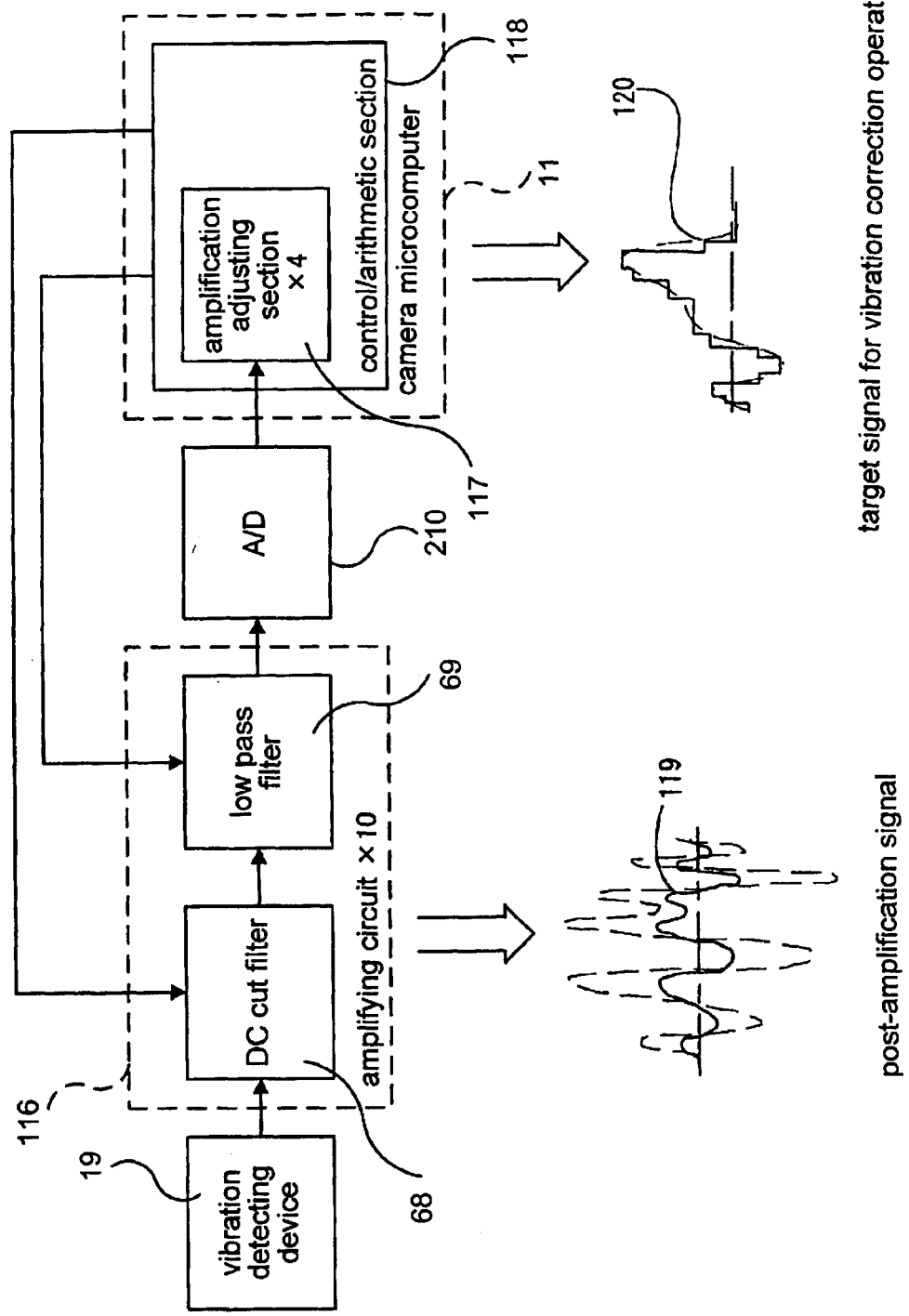
FIG. 2 is an explanatory drawing for gain settings in lens drive in the embodiment 1 of the present invention.

FIG. 2 shows allocation of the amplification factors to each device and circuit allocated by the control/arithmetic section 118) when the picture-taking optical system is driven for zoom or focusing. An output from the vibration detecting device 19 is amplified by 10 times by the amplifying circuit 116 to result in a signal shown as a waveform 119.

An amplification factor actually required for exposure is 40 times based on calculation from the error in the quantization of the A/D conversion, and the waveform 119 has an amplitude which is a quarter of a waveform (shown by a broken line) at the calculated amplification factor. The signal is quantized by the A/D converting circuit 210, acquired by the camera microcomputer 11, and amplified by four times by an amplification adjusting section 117 in the next stage to adjust insufficient amplification. Then, a control/arithmetic section 118 in the camera microcomputer 11 performs arithmetic processing to produce a target value signal for the vibration correction operation.

A waveform 120 represents the aforementioned target value signal for the vibration correction operation. Due to the low amplification factor in the amplifying circuit 116 as mentioned above, a quantization error occurs (very small changes in the signal are not represented) at the A/D conversion, and then the amplification adjusting section 117 again performs amplification, so that the waveform 120 represents a signal of a stepped shape, for example.

The target value for the vibration correction operation has accuracy inadequate to vibration correction for exposure, but has accuracy sufficient for stably maintaining the control/arithmetic section 118 or observing the vibration correcting state (for observing a subject through a vibration preventing lens without performing exposure as in a single-lens reflex camera).

The drive for zoom or focusing is completed and the predetermined time period (for example, 0.3 seconds) elapses, and a signal of the vibration detecting device 19 includes a smaller effect of a disturbance vibration. Then, as shown in FIG. 3, the amplification factor is changed.

Figure 3:
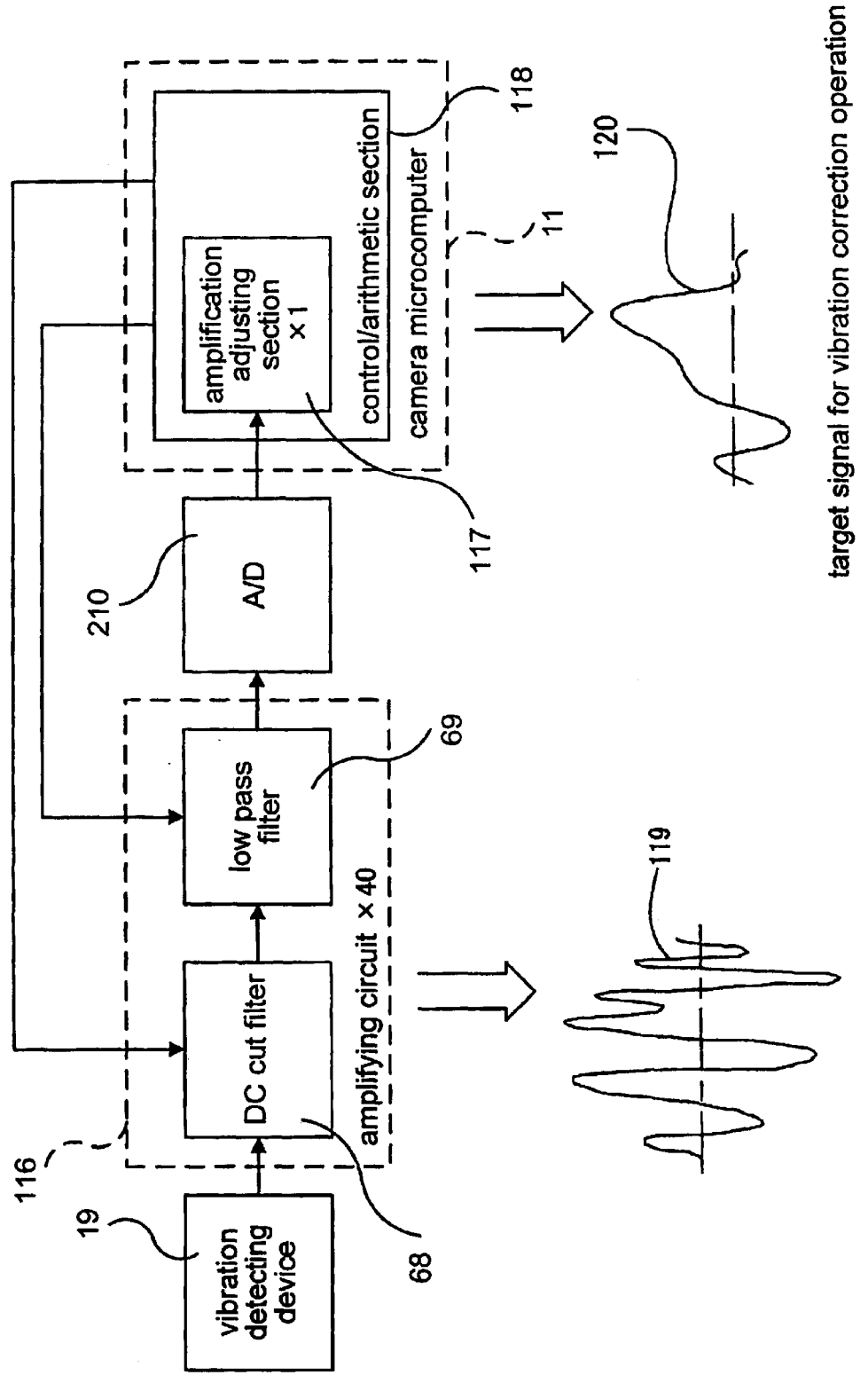
FIG. 3 is an explanatory drawing for gain settings in exposure in the embodiment 1 of the present invention.

In FIG. 3, the amplification factor of the amplifying circuit 116 is increased by 40 times because input of a large disturbance vibration is not expected. Simultaneously, the amplification factor of the amplification adjusting section 117 is reduced to one time to achieve a gain equal to that in FIG. 2 as a whole.

A waveform 119 in FIG. 3 has an amplitude which is four times larger than that in FIG. 2 to result in a small quantization error at the A/D conversion, so that a target value signal for the vibration correction operation has a continuous waveform shown as a waveform 120 in FIG. 3 to allow sufficient accuracy for vibration correction.

Figure 4:
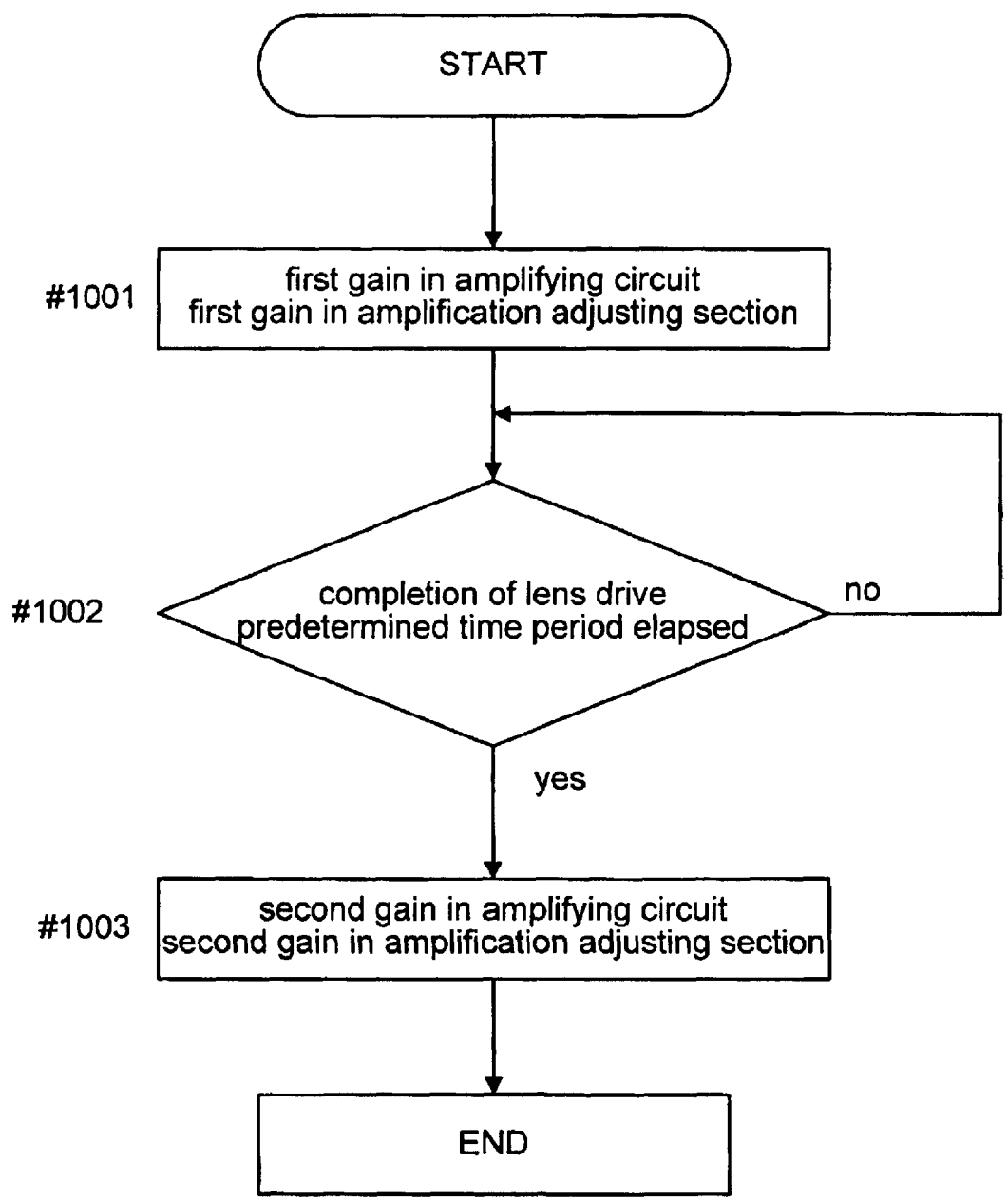
FIG. 4 is a flow chart showing operation of main portions of the camera in the embodiment 1 of the present invention.

FIG. 4 is a flow chart showing operation of the control/arithmetic section 118 in the camera microcomputer 11. The flow starts in response to the start of zoom or focusing drive of the camera. Before the start of the flow, the amplification factor of the amplifying circuit 116 is set to a second gain (40 times in FIG. 3), and the amplification factor of the amplification adjusting section 117 is set to a second gain (one time in FIG. 3).

After the flow starts, at step #1001, the circuit state in FIG. 2 is entered. Specifically, the amplification factor of the amplifying circuit 116 is set to a first gain (ten times in FIG. 2), and the amplification factor of the control/arithmetic section 118 (amplification adjusting section 117) is set to a first gain (four times in FIG. 2) to prepare for a disturbance vibration due to lens drive.

At next step #1002, the camera waits until the predetermined time period (for example, 0.3 seconds) has elapsed since the end of lens drive (meaning that the camera waits until the effect of a disturbance vibration is reduced in a signal of the vibration detecting device 19). Then, when the effect of the disturbance vibration is reduced, the flow proceeds to step #1003 at which the circuit state in FIG. 3 is again entered. Specifically, the amplification factor of the amplifying circuit 116 is set to the second gain (40 times in FIG. 3) and the amplification factor of the amplification adjusting section 117 is returned to the second gain (one time in FIG. 3) to again start accurate processing, and then the flow is ended.

As described above, in this embodiment, the camera has driving devices (the AF driving device 115 and the zoom driving device 16) for focusing drive of the picture-taking optical system for a subject or zoom drive for changing the focal length, the vibration detecting device 19 for detecting vibration, the amplifying circuit 116 for amplifying a signal of the vibration detecting device 19, the control/arithmetic section 118 for arithmetic processing of a signal from the amplifying circuit 116, and the correcting unit 110 for correcting image blur occurred by the vibration, based on the signal of the control/arithmetic section 118.

The camera is configured to set different amplification factors in the amplifier circuit 116 during drive and stop of the picture-taking optical system by the driving devices or during the predetermined time period after the end of the drive of the picture-taking optical system and after the lapse of the predetermined time period. Specifically, the amplification factor of the amplifying circuit 116 during the drive of the picture-taking optical system or during the predetermined time period after the end of the drive is set to be smaller (because of a large output resulting from a superimposed disturbance vibration) than the amplification factor during the stop of the optical system or after the lapse of the predetermined time period from the end of the drive.

It is thus possible to prevent saturation of the circuits for processing an output signal of the vibration detecting device 19 when a disturbance vibration occurs due to zoom drive or focusing drive.

In addition, with the change in the amplification factor of the amplifying circuit 116, the control/arithmetic section 118 changes the arithmetic method to adjust the change in the amplification factor of the vibration detection signal in the amplifying circuit 116. Specifically, the amplification factor during or after the arithmetic processing in the control/arithmetic section 118 is changed to cancel the change in the amplification factor of the vibration detection signal in the amplifying circuit 116 (by the amplification adjusting section 117).

Consequently, accurate vibration correction can be performed immediately after the possibility of an error signal of the vibration detecting device 19 due to the elimination of disturbance vibration.

(Embodiment 2)

In the aforementioned embodiment 1, the amplification factor of the amplifying circuit 116 is forcedly changed when lens drive is performed for zoom or focusing. Actually, however, the magnitude or frequency of a disturbance vibration depends on the lens drive state.

In zoom drive, for example, the number of revolutions of a motor varies with the degree of consumption of the power supply in the camera. The frequency of a disturbance vibration also changes with that variation to largely change a signal of the vibration detecting device 19. In addition, a drive state for zoom or focusing varies with the attitude of the camera, and a signal of the vibration detecting device 19 also changes with that variation.

In this embodiment of the present invention, the change in the amplification factor of the amplifying circuit 116 is stopped when the vibration detecting device 19 is less affected by a disturbance vibration, thereby allowing accurate vibration detection processing.

Figure 5:
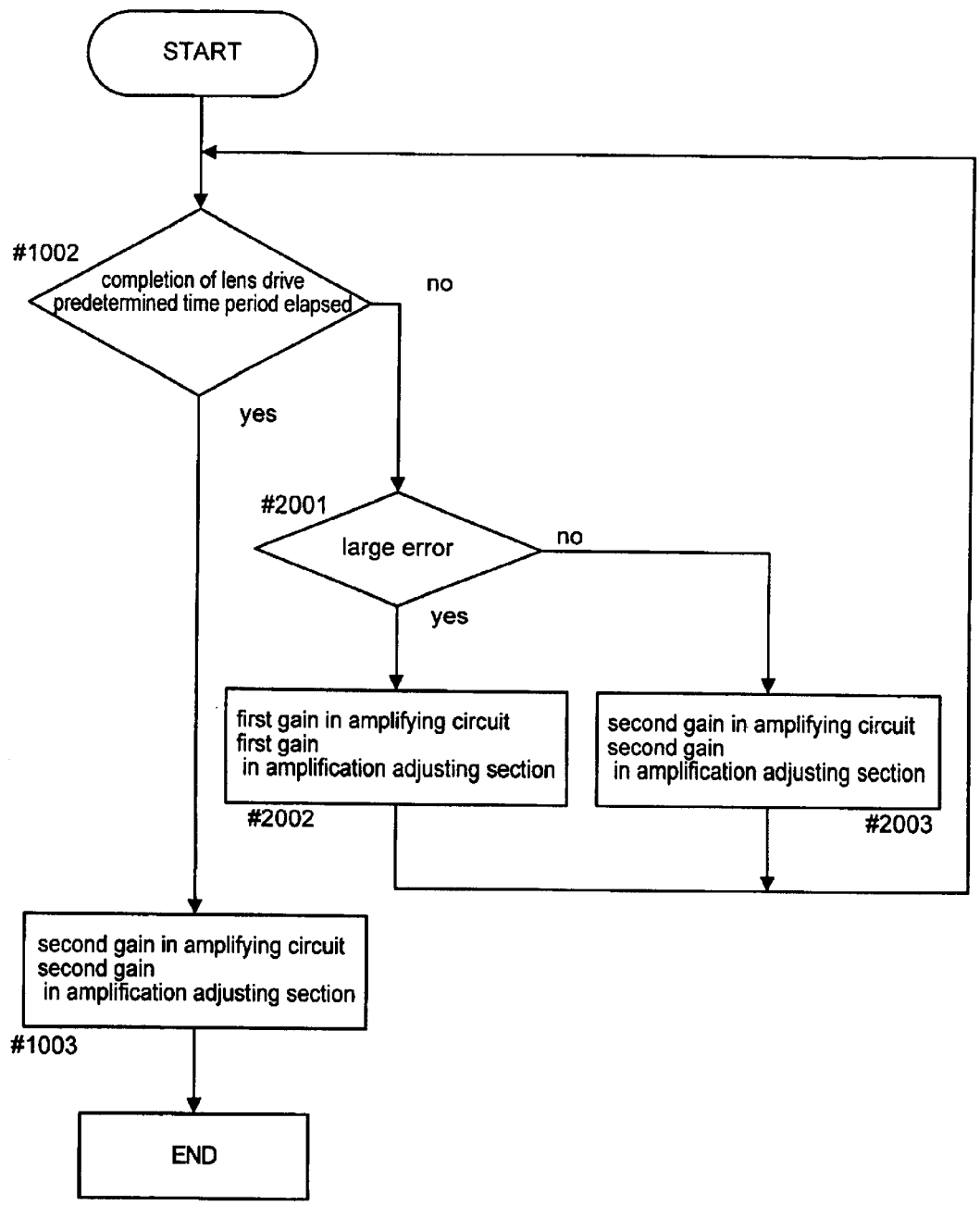
FIG. 5 is a flow chart showing operation of main portions of a camera in another embodiment (embodiment 2) of the present invention.

FIG. 5 is a flow chart showing operation of the control/arithmetic section 118 in the camera microcomputer 11 according to this embodiment, in which steps for the same operations as those in FIG. 4 are designated with the same step numbers. The camera has the similar circuit constitution to that in the aforementioned embodiment 1.

The flow starts in response to the start of lens drive for zoom or focusing drive. Before the start of the flow, the amplification factor of the amplifying circuit 116 is set to the second gain (40 times in FIG. 3), and the amplification factor of the amplification adjusting section 117 is set to the second gain (one time in FIG. 3).

In FIG. 5, it is determined at step #1002 whether or not the lens drive is completed, and the flow proceeds to step #2001 before the lapse of the predetermined time period (for example, 0.3 seconds). At step #2001, it is determined whether or not a signal of the vibration detecting device 19 is at a level larger than a predetermined level. The determination is made by comparing a signal input to the camera microcomputer 11 after A/D conversion with a predetermined reference value to see whether the signal is at a level close to signal saturation of the amplifying circuit 116. When the determination result shows that the output of the vibration detecting device 19 is higher than the predetermined level (meaning a large error), the flow proceeds to step #2002 at which the amplification factor of the amplifying circuit 116 is set to the first gain (ten times in FIG. 2) and the amplification factor of the amplification adjusting section 117 is set to the first gain (four times in FIG. 2) to prevent saturation of the amplifying circuit 116.

On the other hand, when the output of the vibration detecting device 19 is at the predetermined level or lower due to the degree of consumption of the power supply in the camera or the attitude of the camera, the flow proceeds to step #2003 at which the amplification factor of the amplifying circuit 116 is set to the second gain (40 times in FIG. 3), and the amplification factor of the amplification adjusting section 117 is set to the second gain (one time in FIG. 3) to perform accurate arithmetic processing.

In other words, in the loop of steps #1002, #2001, #2002 or #2003, and to #1002 in FIG. 5, the amplification factors of the amplifying circuit 116 and the amplification adjusting section 117 are changed constantly depending on the signal state of the vibration detecting device 19.

Then, when it is determined that the predetermined time period (for example, 0.3 seconds) has elapsed since the completion of the lens drive at step #1002 mentioned above, the flow proceeds to step #1003 at which the amplification factor of the amplifying circuit 116 is set to the second gain (40 times in FIG. 3) and the amplification factor of the amplification adjusting section 117 is set to the second gain (one time in FIG. 3) to perform accurate arithmetic processing. Then, the flow is ended.

As described above, in this embodiment the amplification factor of the amplifying circuit 116 is changed depending on whether the output of the vibration detecting device 19 is larger than the predetermined level during the drive of the picture-taking optical system or during the predetermined time period after the end of the drive of the picture-taking optical system.

It is thus possible to prevent saturation of the circuits for processing an output signal of the vibration detecting device 19 when a disturbance vibration occurs due to the drive of the picture-taking optical system.

With the change in the amplification factor of the amplifying circuit 116, the control/arithmetic section 118 changes the arithmetic method to adjust the change in the amplification factor of the vibration detection signal in the amplifying circuit 116. Specifically, the amplification factor during or after the arithmetic processing in the control/arithmetic section 118 is changed to cancel the change in the amplification factor of the vibration detection signal in the amplifying circuit 116.

Consequently, accurate vibration correction can be performed immediately after the possibility of an error signal of the vibration detecting device 19 due to the elimination of disturbance vibration.

(Embodiment 3)

In the aforementioned embodiment 1, the amplification factor of the amplifying circuit 116 is forcedly changed when lens drive is performed for zoom or focusing. Actually, however, the magnitude or frequency of a disturbance vibration depends on the lens drive state.

In focusing drive, for example, a lens is extended by different lengths and focusing drive is performed for different time periods depending on the focal length (telephoto or wide angle state). Since the extended length of a lens barrel is changed, the state of a vibration occurring when the lens is driven is also changed.

In this embodiment 3, even when a disturbance vibration occurs, the change in the amplification factor of the amplifying circuit 116 is stopped if the disturbance vibration has a small influence on the vibration detecting device 19 in consideration of the focal length of a picture-taking optical system. Thus, accurate arithmetic processing for vibration detection can be always performed.

Figure 6:
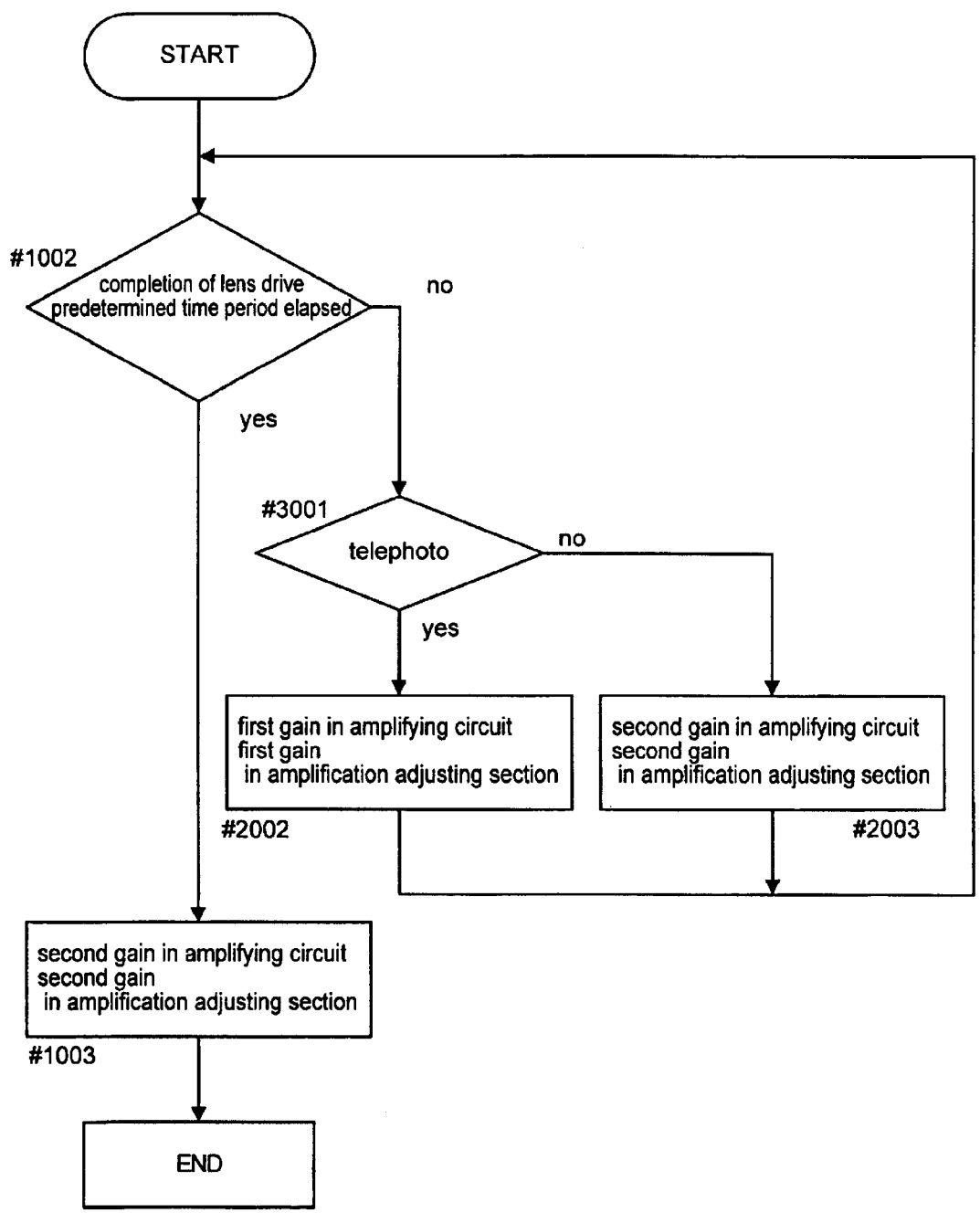
FIG. 6 is a flow chart showing operation of main portions of a camera in still another embodiment (embodiment 3) of the present invention.
Figure 7:
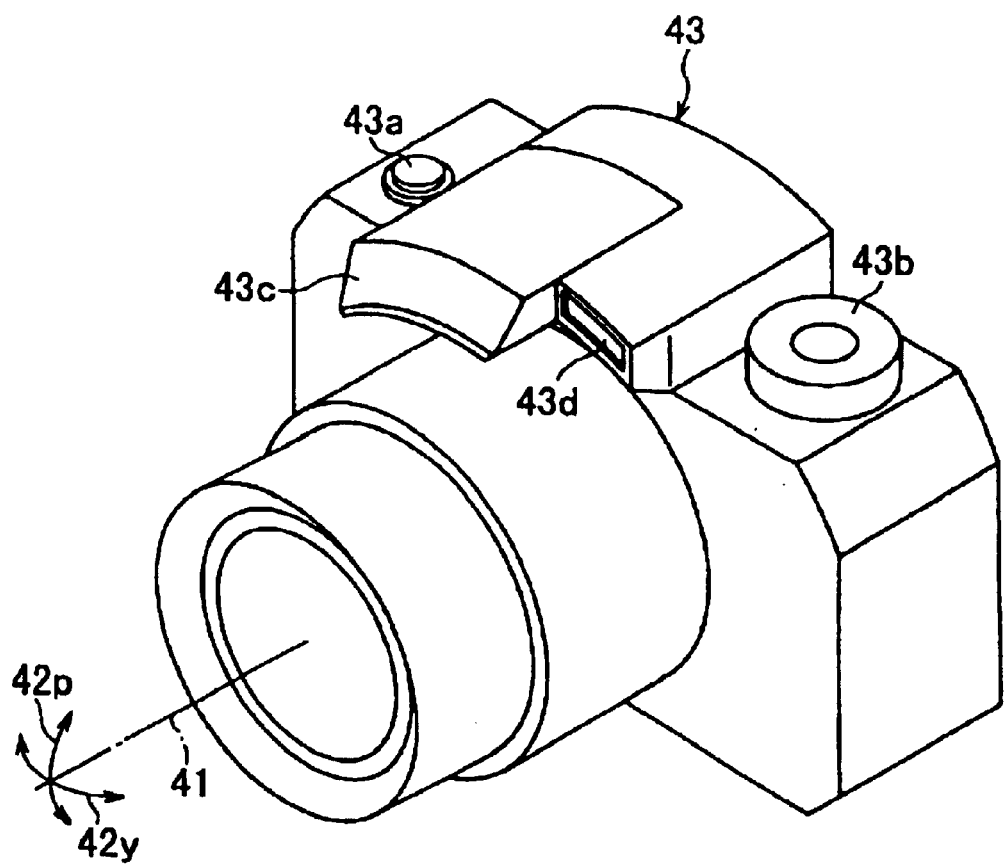
FIG. 7 is a perspective view showing the whole structure of a camera provided with a vibration preventing system in the related art.
Figure 8:
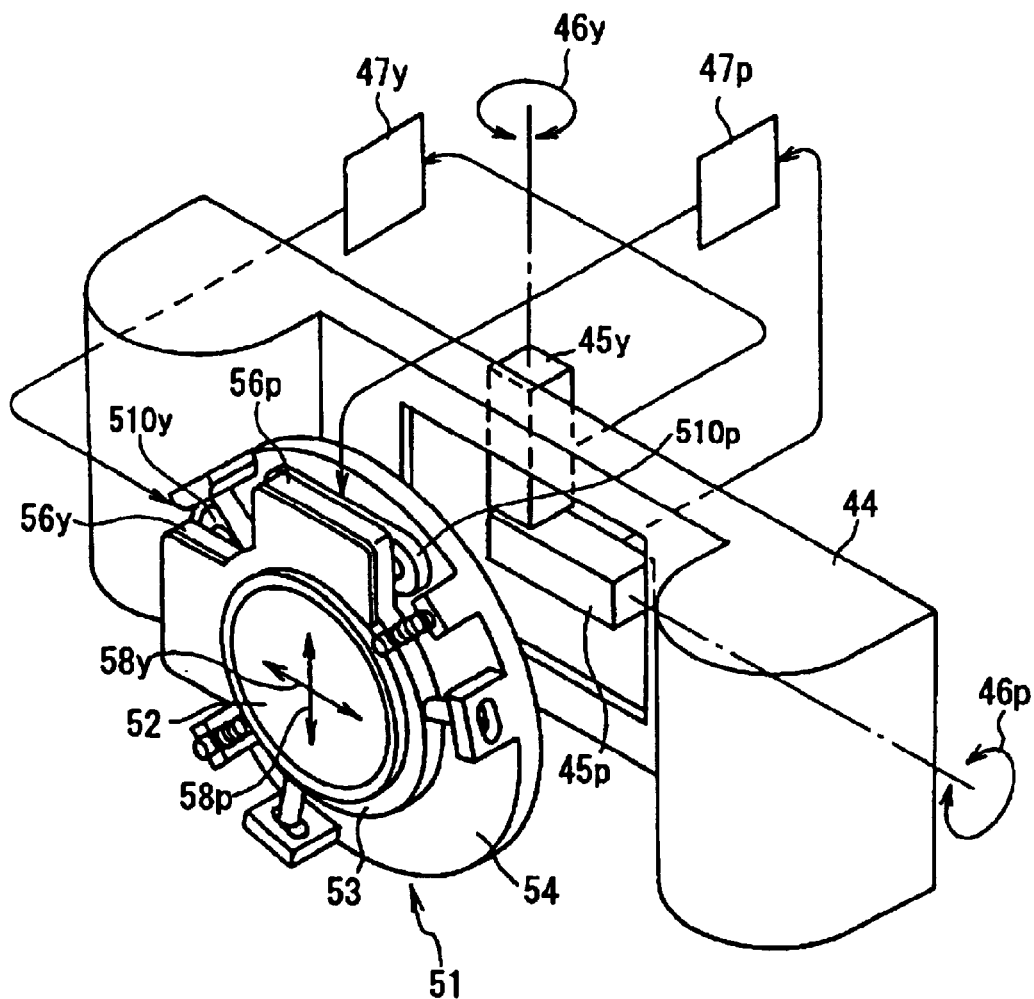
FIG. 8 is a perspective view showing the internal structure of the camera provided with the vibration preventing system in the related art.

FIG. 6 is a flow chart showing operation of the control/arithmetic section 118 in the camera microcomputer 11 according to this embodiment 3, in which steps for the same operations as those in FIGS. 4 and 5 are designated with the same step numbers. The camera has the similar circuit constitution to that in the aforementioned embodiment 1.

The flow starts in response to the start of lens drive for zoom or focusing. Before the start of the flow, the amplification factor of the amplifying circuit 116 is set to the second gain (40 times in FIG. 3), and the amplification factor of the amplification adjusting section 117 is set to the second gain (one time in FIG. 3).

In FIG. 6, it is determined a step #1002 whether or not the lens drive is completed, and the flow proceeds to step #3001 before the lapse of the predetermined time period (for example, 0.3 seconds). At step #3001, it is determined whether or not the focal length of the picture-taking optical system currently is a telephoto state. When the determination result shows that the focal length is the telephoto state, the flow proceeds to step #2002 at which the amplification factor of the amplifying circuit 116 is set to the first gain (ten times in FIG. 2) and the amplification factor of the amplification adjusting section 117 is set to the first gain (four times in FIG. 2) to prevent saturation of the amplifying circuit 116. This is because there is a possibility of saturation of the amplifying circuit 116 since a large disturbance vibration occurs to produce a large signal of the vibration detecting device 19 when focusing drive is performed in the telephoto state.

On the other hand, when the determination result that the focal length is not the telephoto state (focusing drive is performed in a wide angle state), the flow proceeds from step #3001 to step #2003 at which the amplification factor of the amplifying circuit 116 is changed to the second gain (40 times in FIG. 3) and the amplification factor of the amplification adjusting section 117 is changed to the second gain (one time in FIG. 3) to perform accurate arithmetic processing.

Then, when the predetermined time period (for example, 0.3 seconds) has elapsed since the completion of the lens drive at step #1002, the flow proceeds to step #1003.

When the flow proceeds to step #1003, the amplification factor of the amplifying circuit 116 is returned to the second gain (40 times in FIG. 3) and the amplification factor of the amplification adjusting section 117 is returned to the second gain (one time in FIG. 3) to perform accurate arithmetic processing. Then, the flow is ended.

In the flow, the predetermined time period as a standby time after the completion of the lens drive may be changed depending on the focal length of the picture-taking optical system. For example, the amplification factors may also be changed to the first ones in an intermediate (middle) focal length (the amplification factors are not changed only in the wide angle state), and the amplification factors are returned to the second ones after a standby time of 0.3 seconds after the completion of lens drive in the telephoto state, while the amplification factors are returned to the second ones without any standby time (or after a standby time of 0.1 seconds) in the middle state.

As described above, in this embodiment the amplification factor of the vibration detection signal in the amplifying circuit 116 is changed depending on the condition for taking pictures during the drive of the picture-taking optical system or during the predetermined time period after the drive of the optical system, that is, depending on the focal length of the camera (the picture-taking optical system).

It is thus possible to prevent saturation of the circuits for processing an output signal of the vibration detecting device 19 when a disturbance vibration occurs due to the drive of the picture-taking optical system.

With the change in the amplification factor of the amplifying circuit 116, the control/arithmetic section 118 changes the arithmetic method to adjust the change in the amplification factor of the vibration detection signal in the amplifying circuit 116. Specifically, the amplification factor during or after the arithmetic processing in the control/arithmetic section 118 is changed to cancel the change in the amplification factor of the vibration detection signal in the amplifying circuit 116.

Consequently, accurate vibration correction can be performed immediately after the possibility of an error signal of the vibration detecting device 19 due to the elimination of disturbance vibration.

As described above, according to the embodiments, it is possible to provide the signal controller for the vibration detecting unit which experiences no saturation of the circuit for processing a detected vibration output even when a disturbance vibration occurs and which can achieve accurate vibration correction immediately after drive of the picture-taking optical system is completed.

It is also possible to provide the signal controller for the vibration detecting unit which gives priority to accurate arithmetic processing for vibration detection when a disturbance vibration, even if occurring, has a small influence on a detected vibration output.

While preferred embodiments of a film camera have been described, the present invention can be used in digital cameras, video cameras and the like.

While preferred embodiments have been described, it is to be understood that modification and variation of the present invention may be made without departing from the sprit or scope of the following claims.

What is claimed is:

1. A control apparatus for image blur correction, comprising:

a driving member which drives a lens unit;

a detecting unit which detects vibration to output a vibration signal that is an analog signal;

an amplifying circuit which amplifies said vibration signal by using a first amplification factor that is changeable;

a converting circuit which converts the signal amplified by said amplifying circuit to a digital signal;

an amplification adjusting circuit which adjusts the digital signal by using a second amplification factor that is changeable; and a changing circuit which changes said first and second amplification factor depending on whether or not said lens unit is being driven by said driving member;

wherein said changing circuit sets said first amplification factor to be a first value when said lens unit is being driven, and sets said first amplification factor to be a second value which is higher than said first value when said lens unit isn't being driven, and sets said second amplification factor to be a third value when said lens unit is being driven, and sets said second amplification factor to be a fourth value which is lower than said third value when said lens unit isn't being driven.

2. The control apparatus according to claim 1, wherein said changing circuit changes said first amplification factor after a predetermined time period upon completion of the drive of said lens unit.

3. The control apparatus according to claim 2, wherein said changing circuit changes a processing program for said digital signal depending on whether or not said lens unit is being driven, after a predetermined time period upon completion of the drive of said lens unit.

4. The control apparatus according to claim 1, wherein said lens unit includes a focusing lens.

5. The control apparatus according to claim 1, wherein said lens unit includes a zoom lens.

6. The control apparatus according to claim 1, further comprising a correcting optical unit which corrects image blur in accordance with the vibration signal from said detecting unit.

7. An optical system including an optical unit which moves on an optical axis and a driving member which drives said optical unit, said optical system comprising:

a driving member which drives a lens unit;

a detecting unit which detects a vibration to output a vibration signal that is an analog signal;

an amplifying circuit which amplifies said vibration signal by using a first amplification factor that is changeable;

a converting circuit which converts the signal amplified by said amplifying circuit to a digital signal;

an amplification adjusting circuit which adjusts the digital signal by using a second amplification factor that is changeable; and a changing circuit which changes said first and second amplification factor depending on whether or not said lens unit is being driven by said driving member, wherein said changing circuit sets said first amplification factor to be a first value when said lens unit is being driven, and sets said first amplification factor to be a second value which is higher than said first value when said lens unit isn't being driven, and sets said second amplification factor to be a third value when said lens unit is being driven, and sets said second amplification factor to be a fourth value which is lower than said third value when said lens unit isn't being driven.

8. The optical system according to claim 7, wherein said changing circuit changes said first amplification factor after a predetermined time period upon completion of the drive of said lens unit.

9. The optical system according to claim 8, wherein said changing circuit changes a processing program for said digital signal depending on whether or not said lens unit is being driven, after a predetermined time period upon completion of the drive of said lens unit.

10. The optical system according to claim 7, wherein said lens unit includes a focusing lens.

11. The optical system according to claim 7, wherein said lens unit includes a zoom lens.

12. The optical system according to claim 7, further comprising a correcting optical unit which corrects image blur in accordance with the vibration signal from said detecting unit.

* * * * *